(12) United States Patent
Goers et al.

(10) Patent No.: US 11,634,109 B2
(45) Date of Patent: Apr. 25, 2023

(54) METHOD FOR DECELERATING A VEHICLE, IN PARTICULAR A COMMERCIAL VEHICLE, ELECTRO-PNEUMATIC BRAKE SYSTEM FOR DECELERATING A VEHICLE, AND VEHICLE HAVING AN ELECTRO-PNEUMATIC BRAKE SYSTEM

(71) Applicant: WABCO GmbH, Hannover (DE)

(72) Inventors: Andreas Goers, Pattensen (DE); Christoph Brockmann, Hemmingen (DE); Julian Van Thiel, Burgwedel (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 595 days.

(21) Appl. No.: 16/631,852

(22) PCT Filed: May 31, 2018

(86) PCT No.: PCT/EP2018/064341
§ 371 (c)(1),
(2) Date: Jan. 17, 2020

(87) PCT Pub. No.: WO2019/034297
PCT Pub. Date: Feb. 21, 2019

(65) Prior Publication Data
US 2020/0156601 A1    May 21, 2020

(30) Foreign Application Priority Data

Aug. 17, 2017 (DE) .......................... 102017007788.6

(51) Int. Cl.
*B60T 8/17* (2006.01)
*B60T 8/171* (2006.01)
(Continued)

(52) U.S. Cl.
CPC ................ *B60T 8/17* (2013.01); *B60T 8/171* (2013.01); *B60T 8/327* (2013.01); *B60T 13/662* (2013.01);
(Continued)

(58) Field of Classification Search
CPC .......... B60T 8/17; B60T 13/662; B60T 8/327; B60T 8/171; B60T 2240/00;
(Continued)

(56) References Cited

U.S. PATENT DOCUMENTS 5,718,486 A * 2/1998 Vollmer ................ B60T 13/683
303/3
5,752,748 A 5/1998 Schramm et al.
(Continued)

FOREIGN PATENT DOCUMENTS

DE    3603143 A1    8/1987
DE    4227084 A1    2/1994
(Continued)

OTHER PUBLICATIONS

Robert Bosch Gmbh, "Kraftfahrtechnisches Taschenbuch," Jan. 2007, pp. 902-907, Verlag Friedr. Vieweg & Sohn GWV Fachverlage GmbH Wiesbaden, Wiesbaden, Germany.
(Continued)

*Primary Examiner* — Pamela Rodriguez
(74) *Attorney, Agent, or Firm* — Leydig, Voit & Mayer, Ltd.

(57) ABSTRACT

A method is provided for decelerating a vehicle. The vehicle has an electro-pneumatic brake system, at least one front axle, at least one rear axle, and a brake value transmitter. The vehicle further includes at least one axle modulator for the front axle of the vehicle, for performing control of at least one front axle brake pressure at the at least one front axle, and/or at least one axle modulator for the rear axle of the
(Continued)

vehicle, for performing control of a rear axle brake pressure at the at least one rear axle of the vehicle. The method includes generating a redundancy signal at a first axle, the front axle or rear axle, or at a trailer control valve, and performing open-loop and/or closed-loop control of an auxiliary brake pressure at another axle, the front axle or the rear axle, via the redundancy signal.

18 Claims, 5 Drawing Sheets

(51) Int. Cl.
    *B60T 8/32*         (2006.01)
    *B60T 13/66*       (2006.01)
    *B60T 13/68*       (2006.01)

(52) U.S. Cl.
    CPC ......... *B60T 13/683* (2013.01); *B60T 2240/00* (2013.01); *B60T 2270/402* (2013.01); *B60T 2270/413* (2013.01); *B60T 2270/82* (2013.01)

(58) Field of Classification Search
    CPC ......... B60T 2270/413; B60T 2270/402; B60T 2270/82; B60T 13/683
    See application file for complete search history.

(56) References Cited

U.S. PATENT DOCUMENTS

| | | | |
|---|---|---|---|
| 8,770,674 B2* | 7/2014 | Brockmann | B60T 8/3605 303/20 |
| 9,205,818 B2 | 12/2015 | Széll et al. | |
| 9,315,179 B2* | 4/2016 | Herges | B60T 7/20 |
| 11,370,404 B2* | 6/2022 | Michaelsen | B60T 13/683 |
| 2001/0033105 A1 | 10/2001 | Frank et al. | |
| 2003/0025388 A1 | 2/2003 | Roether et al. | |
| 2013/0184957 A1 | 7/2013 | Herges et al. | |
| 2017/0210365 A1* | 7/2017 | Lülfing | B60T 13/268 |
| 2022/0144232 A1* | 5/2022 | Van Thiel | B60T 17/22 |

FOREIGN PATENT DOCUMENTS

| | | |
|---|---|---|
| DE | 10133440 C2 | 6/2003 |
| DE | 4339570 B4 | 3/2004 |
| DE | 102005062907 B3 | 5/2007 |
| DE | 102008009043 B3 | 5/2009 |
| DE | 102008029311 A1 | 12/2009 |
| DE | 102010021909 A1 | 12/2012 |
| EP | 1132274 A1 | 9/2001 |
| EP | 2576297 B1 | 7/2017 |
| GB | 2270130 A | 3/1994 |

OTHER PUBLICATIONS

European Patent Office, "Notice of Opposition" against EP-Patent EP3668764B1, Jan. 2022, pp. 1-40, European Patent Office, Munich, Germany.

* cited by examiner

METHOD FOR DECELERATING A VEHICLE, IN PARTICULAR A COMMERCIAL VEHICLE, ELECTRO-PNEUMATIC BRAKE SYSTEM FOR DECELERATING A VEHICLE, AND VEHICLE HAVING AN ELECTRO-PNEUMATIC BRAKE SYSTEM

CROSS REFERENCE TO RELATED APPLICATIONS

This application is a U.S. National Phase Application under 35 U.S.C. § 371 of International Application No. PCT/EP2018/064341, filed on May 31, 2018, and claims benefit to German Patent Application No. DE 10 2017 007 788.6, filed on Aug. 17, 2017. The International Application was published in German on Feb. 21, 2019 as WO 2019/034297 under PCT Article 21(2).

FIELD

The invention relates to a method for decelerating a vehicle comprising a brake system having at least one front axle and a rear axle, a brake value transmitter with at least one sensor for generating a brake control signal for performing open-loop and/or closed-loop control of the brake system, and at least one axle modulator for the front axle of the vehicle, for performing open-loop and/or closed-loop control of at least one front axle brake pressure at the front axle and/or at least one axle modulator for the rear axle of the vehicle, for performing open-loop and/or closed-loop control of a rear axle brake pressure at the rear axle of the vehicle.

BACKGROUND

Brake systems and methods for decelerating a vehicle are sufficiently known. For example, DE 10 2010 021 909 A1 discloses a pressure-medium-activated and partially electronic brake system of a vehicle having at least two axles, and a method for such a brake system having an electronically controlled rear axle brake system and a pneumatically controlled front axle brake system. In this context, the brake system comprises a dual-channel pneumatic foot brake valve which, in accordance with activation by the driver, generates brake pressures for wheel brakes of a front axle for a front axle brake circuit, and control pressures or backup pressures for wheel brakes of a rear axle for a rear axle brake circuit.

DE 101 33 440 C2 describes in turn a compressed air brake system having an electro-pneumatic modulator. This is an electro-pneumatic compressed air brake system having a multi-circuit service brake. The compressed air brake system has two separate pneumatic brake circuits, wherein at least two pistons pneumatically disconnect the first and second brake circuits.

SUMMARY

In an embodiment, the present invention provides a method for decelerating a vehicle. The vehicle has an electro-pneumatic brake system, at least one front axle, at least one rear axle, a brake value transmitter with at least one sensor for generating a brake control signal for performing open-loop and/or closed-loop control of the brake system, and at least one axle modulator for the front axle of the vehicle, for performing open-loop and/or closed-loop control of at least one front axle brake pressure at the at least one front axle, and/or at least one axle modulator for the rear axle of the vehicle, for performing open-loop and/or closed-loop control of a rear axle brake pressure at the at least one rear axle of the vehicle. The method includes generating a redundancy signal at a first axle, the front axle or rear axle, or at a trailer control valve, and performing open-loop and/or closed-loop control of an auxiliary brake pressure at another axle, the front axle or the rear axle, via the redundancy signal.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
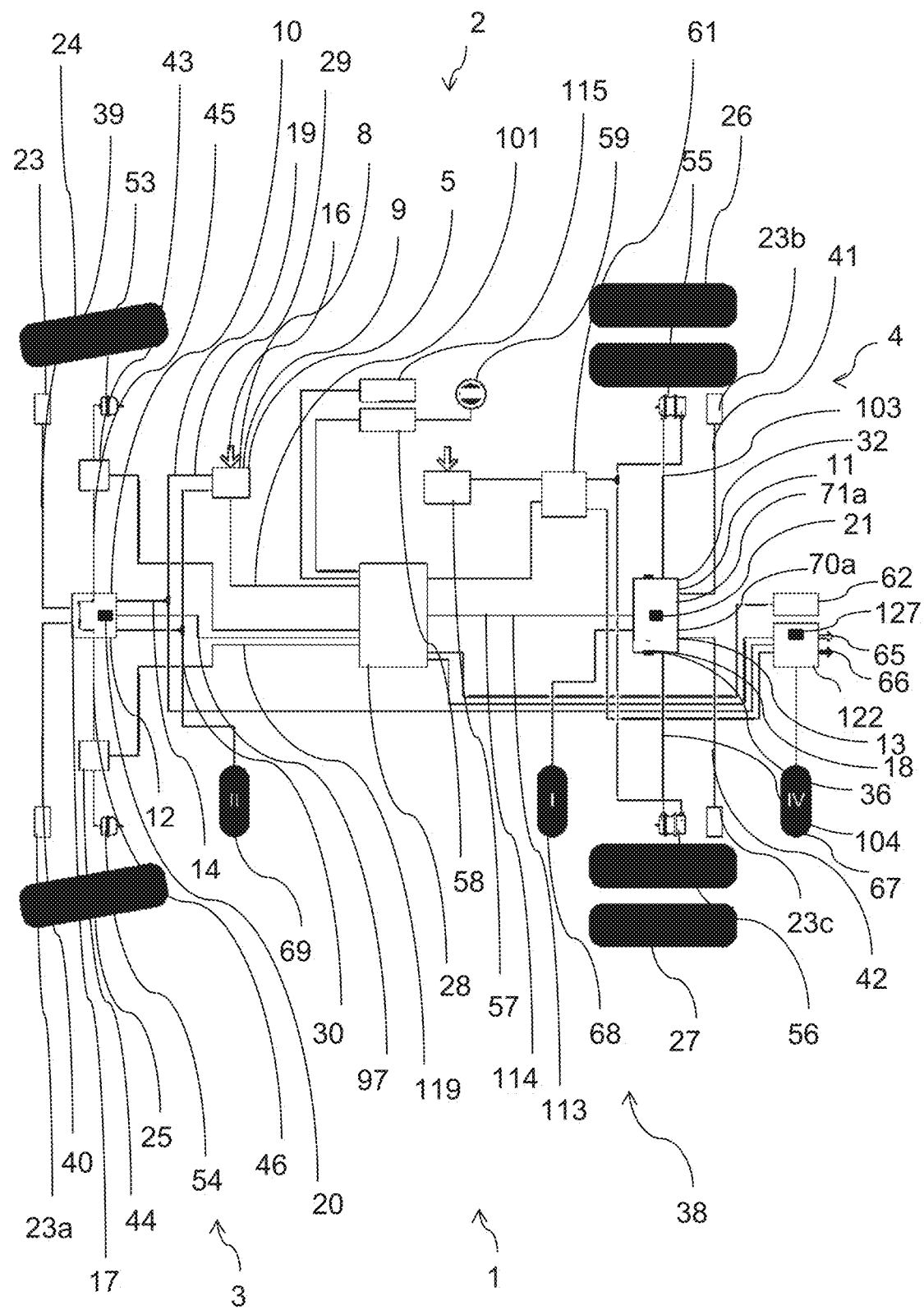
FIG. 1 shows a schematic view of a vehicle in which the brake system is embodied as an electric brake system.

Unless further technical hardware is added, brake systems described in the background section have a problem with reliably detecting a deceleration request of a driver in order to initiate, in the case of redundancy, i.e. for example when a sensor in the brake value transmitter fails, the corresponding activation of the brakes on an axle without pneumatic redundancy.

Insofar as redundant application of pressure at all axles is not possible, a brake system must be equipped with an additional travel sensor. The use of an additional travel sensor has, however, a cost disadvantage owing to the additionally required hardware, such as the third travel sensor, and therefore reduces the competitiveness of the brake system in the automobile sector or in the commercial vehicle sector.

In addition, the additional hardware requires more installation space in a vehicle, which is undesirable from the point of view of a vehicle manufacturer.

The present disclosure describes a method for decelerating a vehicle, a brake system of a vehicle for carrying out the method for decelerating a vehicle, and a vehicle itself, all of which overcome the abovementioned disadvantages and reliably determine the deceleration request of a driver, in order to be able to initiate the corresponding activation of the brakes on an axle without pneumatic redundancy.

The present disclosure describes a method for decelerating a vehicle. In the method, a redundancy signal is generated at a first axle, the front axle or rear axle or in a trailer control valve, and open-loop and/or closed-loop control of a brake pressure of a second axle, the rear axle or the front axle, is carried out by means of the redundancy signal.

In this context, open-loop and/or closed-loop control of the front axle is carried out pneumatically and open-loop and/or closed-loop control of the rear axle is carried out electro-pneumatically. However, it is also conceivable for open-loop and/or closed-loop control of the front axle to be carried out electro-pneumatically and for open-loop and/or closed-loop control of the rear axle to be carried out pneumatically. A different possibility in addition is that open-loop and/or closed-loop control of at least one trailer control valve is carried out pneumatically, and open-loop and/or closed-loop control of the front axle or of the rear axle is carried out electro-pneumatically.

In this context, in one preferred refinement, a pneumatic redundancy pressure is set at the front axle. This redundancy pressure is measured at the front axle and is conveyed as a redundancy signal to the rear axle. The redundancy signal is modulated as an auxiliary brake pressure at the rear axle.

However, it is also possible for the pneumatic redundancy pressure to be set at the rear axle. In this case, the pneumatic redundancy pressure at the rear axle is measured and is conveyed as a redundancy signal to the front axle. The redundancy signal at the front axle is then modulated as an auxiliary brake pressure. Alternatively, the pneumatic redundancy pressure at a trailer control valve can also be determined and used as a redundancy signal for performing closed-loop or open-loop control of the auxiliary brake pressure at at least one further vehicle axle, such as for example a front axle or a rear axle.

In a further advantageous refinement, the redundancy signal corresponds to a pneumatic redundancy pressure of the front axle, of the rear axle or of a trailer control valve for regulating the auxiliary brake pressure of the rear axle or of the front axle. No additional cost-intensive components, such as pneumatic lines, sensors or evaluation devices, are necessary on the vehicle.

The pneumatic redundancy pressure is advantageously determined by a pressure sensor on the front axle, on the rear axle or in the trailer control valve for performing open-loop and/or closed-loop control of the auxiliary brake pressure of the rear axle or of the auxiliary brake pressure of the front axle. The pressure sensor measures the pneumatic redundancy pressure which is present at the front axle or the rear axle and passes on the measured pneumatic redundancy pressure as a pressure sensor signal to a central module or to a further electrical control unit, such as for example to an electronic control unit of an electronic parking brake or directly to an axle modulator of the second axle, in particular of the rear axle or of the front axle, of the vehicle. The pressure sensor signal corresponds to the redundancy signal.

In a further advantageous refinement, the pressure sensor is integrated into the axle modulator of the rear axle, into the axle modulator of the front axle and/or the trailer control valve of the brake system. Therefore, the pneumatic redundancy pressure at the front axle, at the rear axle or at the trailer control valve can be determined very precisely, since no pressure losses owing to long transmission paths occur.

Furthermore, in a further advantageous refinement the redundancy signal is an electrical redundancy signal for performing closed-loop control of the auxiliary brake pressure of the front axle or of the auxiliary brake pressure of the rear axle. In particular in anti-lock brake systems (ABS), the axle modulators do not have a pressure sensor which can measure a redundancy pressure and output a corresponding pneumatic redundancy signal. If the electronic sensing of the brake pedal activation of the driver fails or if the received signals are implausible, the electrical redundancy signal is modulated via the central module to the axle modulator of the front axle or to the axle modulator of the rear axle. In a further advantageous refinement, the electrical redundancy signal is determined in this case at least with a wheel rotational speed sensor, in particular for decelerating the front axle or the rear axle, in the brake system. Insofar as there is no pressure sensor present for measuring the pneumatic redundancy pressure from which the applied brake pressure of the front axle or of the rear axle can be determined, the at least one wheel rotational speed sensor of a drive wheel of the front axle or of the rear axle of the vehicle determines the deceleration or the slip of the at least one wheel of the front axle or of the rear axle where the pneumatically modulated redundancy pressure is present, and passes on the measured deceleration or the measured slip as an electrical redundancy signal for checking the plausibility of the brake control signals or for performing open-loop and/or closed-loop control of an auxiliary brake pressure directly to the central module or to an axle modulator of the rear axle or of the front axle of the vehicle.

The at least one wheel rotational speed sensor is advantageously arranged on at least one wheel of the front axle or at least on one wheel of the rear axle of the brake system. Specifically, the wheel rotational speed sensor comprises a pole wheel which is connected to a wheel hub of the front wheel or to a wheel hub of the rear wheel, and a rod sensor. The rod sensor is displaceably clamped with a clamp or a sensor holder in a drilled hole in a stub axle of the front axle or a stub axle of the rear axle. The magnetic flux which is sensed by the sensor pole of the rod sensor is changed by the rotational movement of the pole wheel connected to the wheel hub, and as a result an alternating voltage is generated, the frequency of which is proportional to the wheel speed. If the wheel rotational speed sensor is arranged on at least one wheel of the front axle, the wheel rotational speed sensor senses the wheel speeds at the front axle and transmits them as an electrical redundancy signal via at least one first signal line from the axle modulator of the front axle to the central module or a further electrical control unit and from the central module or the further electrical control unit via a third signal line to the axle modulator of the rear axle. If the wheel rotational speed sensor is arranged on at least one stub axle of the rear axle, the wheel rotational speed sensor senses the wheel speeds of the rear axle and transmits them as an electrical redundancy signal via at least a third signal line from the axle modulator of the rear axle to the central module or a further electrical control unit and from the central module or the further electrical control unit via a first signal line to the axle modulator on the front axle.

In addition, in a further refinement it is advantageous that a second brake control signal is compared with the first brake control signal in order to determine whether the first and/or the second brake control signal is correct or present. The activation of the brake pedal is sensed before this. A first travel sensor determines a first electronic brake control signal, and a second travel sensor of the brake value transmitter determines a second electronic brake control signal. The first brake control signal is subsequently compared with the second brake control signal. The first brake control signal and the second brake control signal serve to actuate an inlet valve and an outlet valve of the axle modulator of the front axle and of the axle modulator of the rear axle. The checking of the brake control signals is a safety function. This ensures that the same or the correct brake pressure is present both at the front axle and at the rear axle of the vehicle, in order to achieve the deceleration in the vehicle which is desired by the driver, and the vehicle is braked, according to the driver's request, uniformly, i.e. without veering off or lurching from side to side.

In a further advantageous refinement, the redundancy signal is compared with the first and/or second brake control signal in the brake value transmitter or in the central module in order to check the plausibility of the correctness or the presence of the first brake control signal and/or of the second brake control signal.

Furthermore, the present disclosure describes an electro-pneumatic brake system and a vehicle for carrying out a method for decelerating the vehicle. The electro-pneumatic brake system comprises at least one brake value transmitter having at least one sensor for generating a brake control signal for performing open-loop and/or closed-loop control of the brake system, and at least one axle modulator for a front axle of the vehicle for performing closed-loop and/or open-loop control of at least auxiliary brake pressure at the front axle and/or at least one axle modulator for a rear axle of the vehicle, for performing closed-loop and/or open-loop control of an auxiliary brake pressure at the rear axle and in/at a trailer control valve for performing closed-loop and/or open-loop control of an auxiliary brake pressure at the trailer brake connection of the vehicle. The electro-pneumatic brake system is designed to determine, when a brake control signal of the at least one sensor of the brake value transmitter is not present or is faulty, a redundancy signal at the front axle, at the rear axle or of the trailer control valve and to use the redundancy signal to decelerate the at least one front axle or alternatively the at least one further axle, in particular the rear axle.

This provides the advantage that no additional components, such as for example a third sensor, have to be used in the brake value transmitter in order to initiate a corresponding safe brake activation on the basis of a deceleration request of a driver, at an axle without pneumatic redundancy. The sensor of the brake value transmitter can be embodied as a travel sensor, as a rotational angle sensor and/or as a pressure sensor. In addition, a closed-loop control is also carried out electro-pneumatically on the at least one further axle. In other words, in brake systems with a pneumatically braked front axle and an electro-pneumatically braked rear axle, no pneumatic lines which conduct the pneumatic redundancy pressure from the brake value transmitter to the rear axle are provided in the brake system.

In a further advantageous refinement, the redundancy signal corresponds to a pneumatic redundancy pressure or to an electrical redundancy signal for performing open-loop and/or closed-loop control of the auxiliary brake pressure of the front axle, or alternatively, of the rear axle.

The redundancy signal advantageously corresponds to a pneumatic redundancy pressure if the axle modulator of the front axle or of the rear axle, or the trailer control valve of the vehicle comprises a pressure sensor. On the other hand, the redundancy signal advantageously corresponds to a further electrical redundancy signal if the brake system is an anti-lock brake system and the axle modulator at the front axle or at the rear axle or the trailer control valve of the vehicle does not comprise a pressure sensor. The redundancy signal is then determined by means of at least one wheel rotational speed sensor on the front axle or on the rear axle.

In addition, the electro-pneumatic brake system comprises a pneumatic inlet valve line to at least one inlet valve and at least one outlet valve of the axle modulator of the front axle or to at least one inlet valve and at least one outlet valve of the axle modulator of the rear axle, wherein the inlet valve and the outlet valve of the axle modulator of the front axle or the inlet valve and the outlet valve of the axle modulator of the rear axle are closed to determine the redundancy signal, since both the inlet valve and the outlet valve are de-energized in the case of a plausible driver's request since the electrical pressure control signal is deactivated. The electro-pneumatic brake system additionally has at least one front axle redundancy valve of the axle modulator of the front axle or alternatively at least one rear axle redundancy valve of the axle modulator of the rear axle, which valve is opened to determine the redundancy signal. The front axle redundancy valve is in an opened position in the de-energized state, i.e. when the electrical pressure controller is deactivated.

In a further advantageous refinement, the brake system has at least one wheel rotational speed sensor for determining the electrical redundancy signal, in particular for decelerating the rear axle or the front axle, of the vehicle in the brake system. The wheel rotational speed sensor is arranged, in particular, on a wheel or within a wheel, for example on a wheel hub of a wheel of the vehicle. It is also conceivable for the wheel rotational speed sensor to be arranged on the front axle or the rear axle of the vehicle.

Furthermore, it has proven advantageous that a second sensor in the brake value transmitter is designed to generate a second brake control signal. The second sensor serves here to provide protection if the first sensor is not functionally capable or is faulty and cannot pass on the brake pressure desired by the driver or the deceleration request to the axle modulator of the rear axle and/or of the front axle.

In a further advantageous refinement, the first electronic brake control signal is designed to actuate an inlet valve and an outlet valve of the axle modulator of the front axle, and/or the second electronic brake control signal is designed to actuate an inlet valve and an outlet valve of the axle modulator of the rear axle.

It is also advantageous that the brake system is designed to perform open-loop and/or closed-loop control of the auxiliary brake pressure of the front axle or of the rear axle directly with the redundancy signal. If the electrical sensing of the brake pedal activation in the brake value transmitter fails, the driver's request or the redundancy signal is determined by means of the wheel rotational speed sensor or by means of the pressure sensor of the front axle, the rear axle or of the trailer control valve of the vehicle. With the redundancy signal, closed-loop or open-loop control is performed at least of the auxiliary brake pressure of a further axle in the vehicle, at which axle the redundancy pressure has not been determined.

Figure 2:
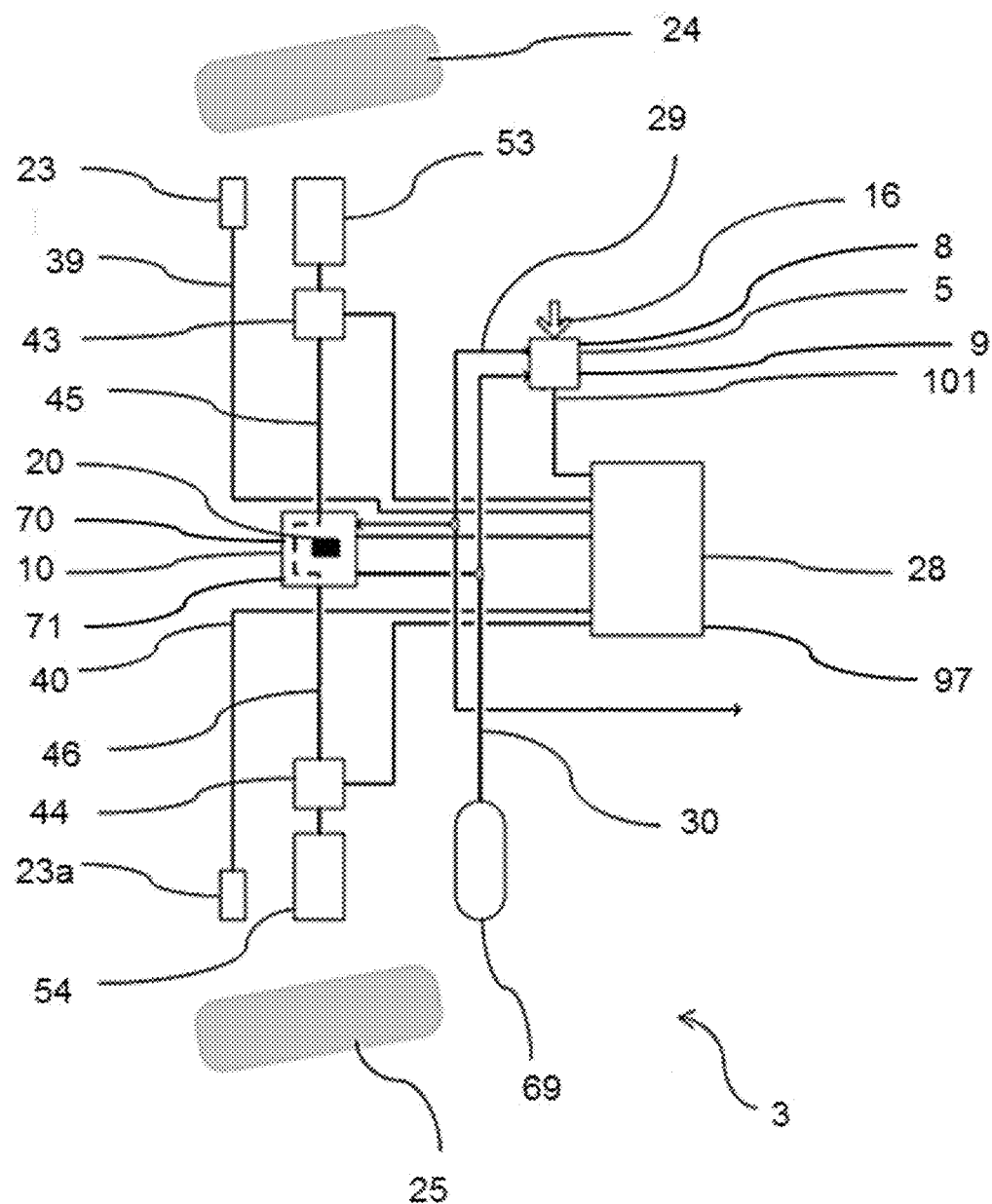
FIG. 2 shows a schematic partial view of a vehicle with a front axle in which the brake system is embodied as an electric brake system.
Figure 3:
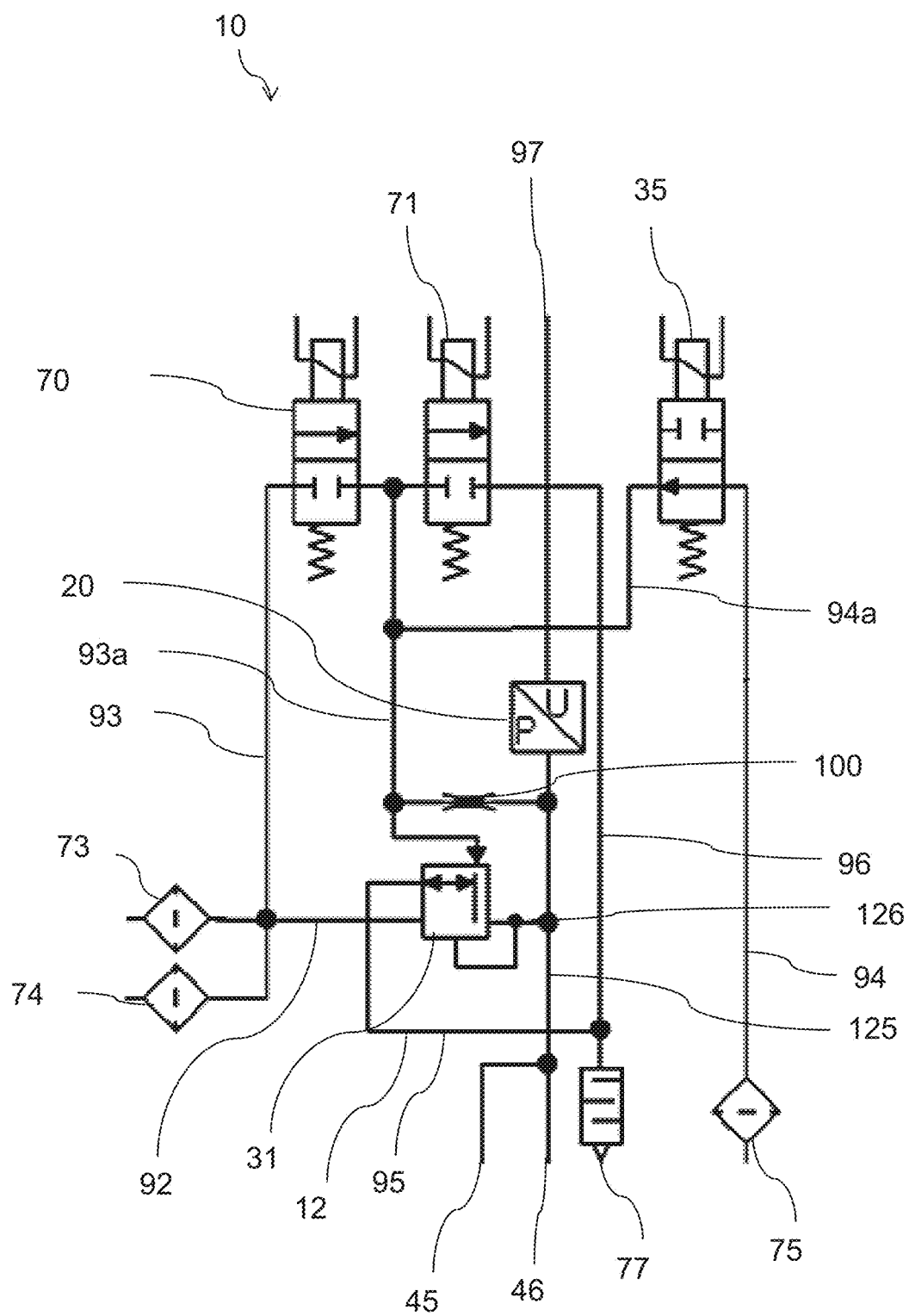
FIG. 3 shows a schematic view of an axle modulator.

FIG. 1 shows an electro-pneumatic brake system 2 of a vehicle 1, which brake system is embodied as an electric brake system (EBS) 38. Firstly, the electric brake system 38 is described generally. The EBS 38 comprises a brake value transmitter 5. The brake value transmitter 5 receives the deceleration request of the driver via a brake pedal 16 and generates a first electronic brake control signal 8 with a first travel sensor 116 (illustrated in FIG. 4), and a second electronic brake control signal 9 with a second travel sensor 117 (illustrated in FIG. 4), in order to actuate an inlet valve 70 and an outlet valve 71 by means of the axle modulator 10 of the front axle 3, and in order to actuate an inlet valve 70a and an outlet valve 71a by means of the axle modulator 11 of the rear axle 4. The inlet valve 70 and the outlet valve 71 of the front axle 3 are shown in FIG. 2 and FIG. 3. A central module 28 performs open-loop and closed-loop control and monitors the EBS 38. Furthermore, the axle modulator 10 of the front axle 3 is arranged on a front axle 3 of the vehicle 1, and the axle modulator 11 of the rear axle 4 is arranged on a rear axle 4 of the vehicle 1. The axle modulator 10 of the front axle 3 controls a front axle brake pressure 12, and the axle modulator 11 of the rear axle 4 controls a rear axle brake pressure 13.

The front axle 3 has a first wheel 24 and a second wheel 25. Arranged on the rear axle 4 are a first wheel 26 of the rear axle 4 and a second wheel 27 of the rear axle 4. A wheel rotational speed sensor 23, 23a, 23b, 23c is arranged on each wheel 24, 25, 26, 27. The first wheel rotational speed sensor 23 is connected to the axle modulator 10 of the front axle 3 via a first wheel rotational speed sensor signal line 39, and the second wheel rotational speed sensor 23a is connected to the axle modulator 10 of the front axle 3 via a second wheel rotational speed sensor signal line 40. The third wheel rotational speed sensor 23b is connected to the axle modulator 11 of the rear axle 4 via a third wheel rotational speed sensor signal line 41, and the fourth wheel rotational speed sensor 23c is connected to the axle modulator 10 of the front axle 4 via a fourth wheel rotational speed sensor signal line 42. The axle modulators 10, 11 sense wheel speeds of the wheels 24, 25, 26, 27 via the wheel rotational speed sensors 23, 23a, 23b, 23c and evaluate them. The current wheel speed is continuously determined by the wheel rotational speed sensor 23, 23a, 23b, 23c by means of a pole wheel (not illustrated) of the respective wheel rotational speed sensor 23, 23a, 23b, 23c. The evaluation of the sensor signals yields a precise picture of the slip of the front axle and/or of the rear axle 4 and therefore indirectly of their pressures in the braking line. If the slip is different, the front axle 3 or the rear axle 4 is braked more strongly than the other axle 3, 4 of the vehicle 1. Consequently, this axle 3, 4 is also subjected to greater wear. The EBS 38 carries out closed-loop control of the front axle brake pressure 12 at the front axle 3 and of the rear axle brake pressure 13 at the rear axle 4 by means of differential slip control in such a way that the braking forces are distributed optimally among the wheels 24, 25, 26, 27 via brake cylinders 53, 54, 55, 56. In this context, the brake cylinders 53 and 54 are arranged on the front axle 3. The brake cylinders 55 and 56 are, on the other hand, arranged on the rear axle 4.

Furthermore, two anti-lock brake system solenoid control valves (ABS solenoid control valves) 43, 44 are arranged on the front axle 3. The ABS solenoid control valves 43, 44 are connected to the axle modulator 10 of the front axle 3 via one solenoid control valve line 45, 46 each. In the case of normal braking of the vehicle 1, that is to say when the wheels 24, 25 of the front axle 3 do not lock, the ABS solenoid control valves 43, 44 are opened. If at least one front wheel 24, 25 locks, an inlet valve (not illustrated) of the ABS solenoid control valve 43, 44 of the front wheel 24, 25 closes. The ABS solenoid control valve 43, 44 at which the inlet valve is closed does not let any further pressure through to one of the brake cylinders 53, 54 of the front axle 3. The locking in at least the one front wheel 24, 25 is cancelled, as a result of which the vehicle 1 is securely braked.

Furthermore, a steering wheel angle sensor 59 makes available a measured value of an absolute angle, i.e. the position of a steering wheel (not illustrated). This comprises the possibility of identifying the zero position of the steering wheel (center position) by means of the sensor calibration. The steering wheel angle sensor 59 communicates with the central module 28 via a brake system data bus interface 58.

A battery 115 supplies the central module 28 with energy.

In addition, the vehicle 1 has a parking brake operator control element 57. The parking brake operator control element 57 communicates with the central module 28 via an electro-pneumatic handbrake system (EPHS) 61. The central module 28 communicates with a trailer (not illustrated) of the vehicle 1 via a trailer brake system data bus interface 62. An exchange of signals or a communication exchange therefore takes place between the vehicle 1 and the trailer. A trailer control valve 122 transmits a requested trailer brake pressure 65 to the trailer. The trailer control valve 122 is additionally connected to a supply pressure accumulator 67. A further supply pressure accumulator 68 is connected to the axle modulator 11 of the rear axle 4. Furthermore, a third supply pressure accumulator 69 is connected to the brake value transmitter 5 and to the axle modulator 10 of the front axle 3.

Generally, actuation of the brake pedal 16 is sensed with the brake value transmitter 5. In this context, the first brake control signal 8 and the second brake control signal 9 are modulated. The second brake control signal 9 is then compared with the first brake control signal 8 in the brake value transmitter 5. Possible faults may be an electrical failure in the brake value transmitter 5 or implausible or differing brake control signals 8 and 9. The electric brake system 38 according to FIG. 1 is embodied in such a way that depending on the fault in the brake value transmitter 5 or in the case of a failure of the brake value transmitter 5 the front axle 3 can be braked pneumatically and the rear axle 4 can be braked electro-pneumatically. However, it is also possible to brake the rear axle 4 pneumatically and the front axle 3 electro-pneumatically. The method of functioning is explained below by way of example with respect to the EBS 38 in which the front axle 3 is braked pneumatically and the rear axle 4 is braked electro-pneumatically. If the brake value transmitter 5 is not fault-free or functionally capable, the pedal stroke is transmitted as a pneumatic redundancy pressure 19 via a pneumatic line 29 of the brake value transmitter 5 from the brake value transmitter 5 to the axle modulator 10. The pressure sensor 20 measures the pneumatic redundancy pressure 19 and generates an electrical pressure sensor signal 119. The electrical pressure sensor signal 119 is transmitted via a first signal line 97 from the axle modulator 10 to the central module 28. In addition, the first wheel rotational speed sensor 23 measures the first wheel speed of the first front wheel 24. The second wheel rotational speed sensor 23a measures the second wheel speed of the second front wheel 25. The first wheel rotational speed sensor signal line 39 of the first wheel rotational speed sensor 23 transmits the first measured wheel speed of the first front wheel 24 from the wheel rotational speed sensor 23 to the axle modulator 10. The second wheel rotational speed sensor signal line 40 of the second wheel rotational speed sensor 23a in turn transmits the second measured wheel speed of the second front wheel 25 from the second wheel rotational speed sensor 23a to the axle modulator 10. Subsequently, an overall wheel speed of the front axle 3 is formed from the first wheel speed and the second wheel speed. The overall wheel speed of the front axle 3 is transmitted via the first signal line 97 from the axle modulator 10 to the central module 28. Subsequently, the electrical pressure sensor signal 119 is compared in the central module with the first brake control signal 8 or the second brake control signal 9 and a setpoint value is formed. The setpoint value and the overall wheel speed or the resulting wheel slip and/or the deceleration form an auxiliary brake control signal. The central module 28 calculates a pressure setpoint value 113 for the rear axle 4 of the vehicle 1 from the auxiliary brake control signal.

The pressure setpoint valve 113 is transmitted from the central module 28 via a third signal line 114 to a pressure sensor 21 of the axle modulator 11 of the rear axle 4. An auxiliary brake pressure 18 is modulated in the axle modulator 11 of the rear axle 4 on the basis of the pressure setpoint value 113. The auxiliary brake pressure 18 is passed on via the first brake cylinder line 103 to the brake cylinder 55 of the first rear wheel 26 and via a second brake cylinder line 104 to the brake cylinder 56 of the second rear wheel 27. The first rear wheel 26 and the second rear wheel 27 are then braked in accordance with the auxiliary brake pressure 18.

FIG. 2 shows the front axle 3 of the vehicle 1 with the electric brake system 38 in detail. FIG. 2 comprises all the components of the front axle 3 according to FIG. 1, for which reason they are not explained in more detail.

FIG. 3 shows a possible embodiment of the axle modulator 10 of the front axle 3 and the axle modulator 11 of the rear axle 4. For example, the one possible embodiment is described as an axle modulator 10 for the front axle 3. The axle modulator 10 has an inlet valve (IV) 70, an outlet valve (OV) 71 and a front axle redundancy valve (RV) 35. The valves 70, 71, 35 are embodied as solenoid control valves. In addition, a pressure sensor 20, a relay valve 31 and a sound damper 77 are arranged in the axle modulator 10. Furthermore, a first supply pressure accumulator 69 (not illustrated) is connected to the relay valve 31 via a first air filter 73 and via a relay valve line 92, and to the inlet valve 70 via an inlet valve line 93. In addition, the supply pressure accumulator 69 (not illustrated) is connected to the relay valve 31 via a second air filter 74 and via a relay valve line 92, and to the inlet valve 70 via an inlet valve line 93, and a third air filter 75 is connected to the RV 35 via a redundancy valve line 94. The double connection of the supply accumulator 69 to the axle modulator 10 via the air filters 73, 74 serves to increase the volume flow which is to be achieved. A second redundancy valve line 94a is arranged from the RV 35 to a second inlet valve line 93a. The sound damper 77 is connected to the relay valve 31 via a first outlet valve line 95 and to the outlet valve 71 via a second outlet valve line 96. Furthermore, the first signal line 97 of the axle modulator 10 of the pressure sensor 20 to the axle modulator control unit (not illustrated) is shown. The second valve inlet line 93a is arranged from the inlet valve 70 and from the outlet valve 71 to the relay valve 31. An orifice 100 connects the second inlet valve line 93a to a relay valve pressure control line 125 of the axle modulator 10 via a relay control valve connecting line 126.

When the vehicle 1 is braked, front axle brake pressure 12 is applied to the relay valve 31 by the second pressure accumulator 69 (not shown) via the IV 70. The relay valve 31 passes through the front axle brake pressure 12 to the ABS solenoid control valve 43 of the first wheel 24 via the solenoid control valve line 45 of the first wheel 24 of the front axle 3 and subsequently to the brake cylinder 53 of the first wheel 24.

In addition, the front axle brake pressure 12 is passed through by the relay valve 31 to the ABS solenoid control valve 44 of the second wheel 25 of the front axle 3 via the solenoid control valve line 46 of the second wheel 25 of the front axle 3, and subsequently to the brake cylinder 54 of the second wheel 25. In the event of failure of the brake value transmitter 5, the IV 70, the OV and the RV are deactivated. The IV 70, OV 71 and the RV are therefore de-energized. The pneumatic redundancy pressure 19 is amplified via the redundancy connection and subsequently via the relay valve 31 and passed through the ABS solenoid control valve 43 of the first wheel 24 and subsequently to the brake cylinder 53 of the first wheel 24 via the solenoid control valve line 45 of the first wheel 24 of the front axle 3.

In addition, the pneumatic redundancy pressure 19 is passed through to the ABS solenoid control valve 44 of the second wheel 25 of the front axle 3 by the relay valve 31 via the solenoid control valve line 46 of the second wheel 25 of the front axle 3, and subsequently to the brake cylinder 54 of the second wheel 25. The RV 35 is opened here, that is to say de-energized. Moreover, the pneumatic redundancy pressure 19 in the pressure sensor 20 of the front axle 3 is measured and is transmitted as an electrical pressure sensor signal 119 to the central module 28 via the first signal line 97.

Figure 4:
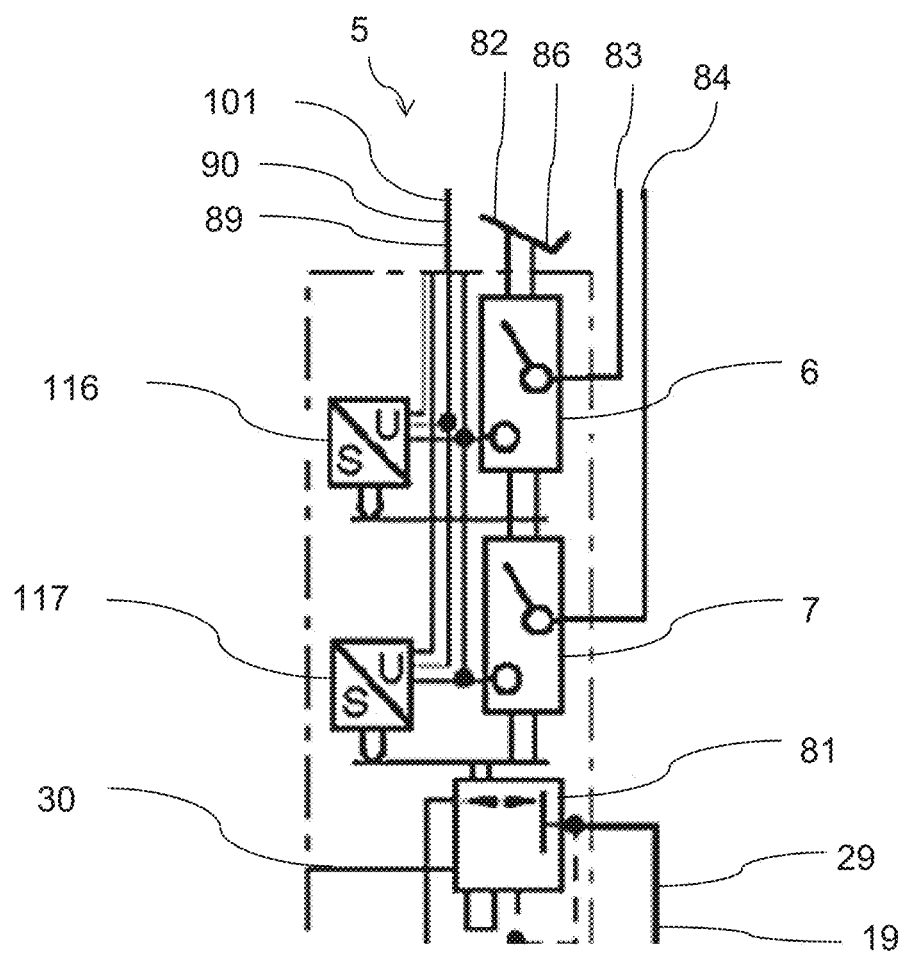
FIG. 4 shows a schematic view of a brake value transmitter.

FIG. 4 shows the design of the brake value transmitter 5. The brake value transmitter 5 comprises a first travel sensor 116, a second travel sensor 117, a first switch 6 and a second switch 7. The pneumatic part of the brake value transmitter 5 is composed of a brake value transmitter relay valve 81, a pneumatic pressure supply line 30 from the brake value transmitter relay valve 81 to the supply pressure accumulator 69 of the front axle. The brake value transmitter relay valve is generally activated by means of a plunger which passes on the pedal travel or the pedal force of the brake pedal 16 to the brake value transmitter relay valve 81. The pneumatic pressure line 29 is additionally connected to a connection on the axle modulator 10 of the front axle 3. The brake value transmitter 5 receives the deceleration request of the driver via the brake pedal 16 and generates the first brake control signal 8 and the second electrical brake control signal 9 for aerating the inlet valve 70 and ventilation of the outlet valve 71 of the axle modulators 10, 11, and the one pneumatic redundancy pressure 19 for modulating an auxiliary brake pressure 17 of the front axle 3 or the auxiliary brake pressure 18 of the rear axle 4. As soon as the brake pedal 16 is activated, the first brake control signal 8 and the second brake control signal 9 are firstly generated in the brake value transmitter 5 and then compared whether the brake control signals 8, 9 correspond to the deceleration request of the driver. The first brake control signal 8 and the second brake control signal are passed on to the central module 28 by the brake value transmitter 5 via a second signal line 101. The brake control signals 8, 9 are used to operate and monitor the braking method. The first switch 6 and the second switch 7 are activated mechanically.

The activation of the brake pedal 16 is recorded as pedal stroke by the first travel sensor 116 and the second travel sensor 117 and is output to the central module 28 as a first travel signal 89 and as a second travel signal 90 by the brake value transmitter 5. The first and the second travel signals 89, 90 are transmitted to the central module 28 from the brake value transmitter 5 via the second signal line 101.

If the brake value transmitter 5 is not fault-free or functionally capable, the driver's request is modulated by means of the pneumatic redundancy pressure 19 from the relay valve 81 of the brake value transmitter 5 directly to the pressure sensor 20 of the axle modulator 10 of the front axle 3 via the pneumatic line 29.

If the electro-pneumatic brake system 2 is embodied as an anti-lock braking system (ABS) 201 or if there is no pressure sensor for measuring redundancy pressure present in the system, when there is a non-fault-free brake value transmitter 250, the driver's request is determined as an electrical redundancy signal 22 by means of the redundancy pressure 19 in the trailer control valve 122 or the slip and the deceleration by means of the wheel rotational speed sensors 223, 223a, 223b, 223c.

Figure 5:
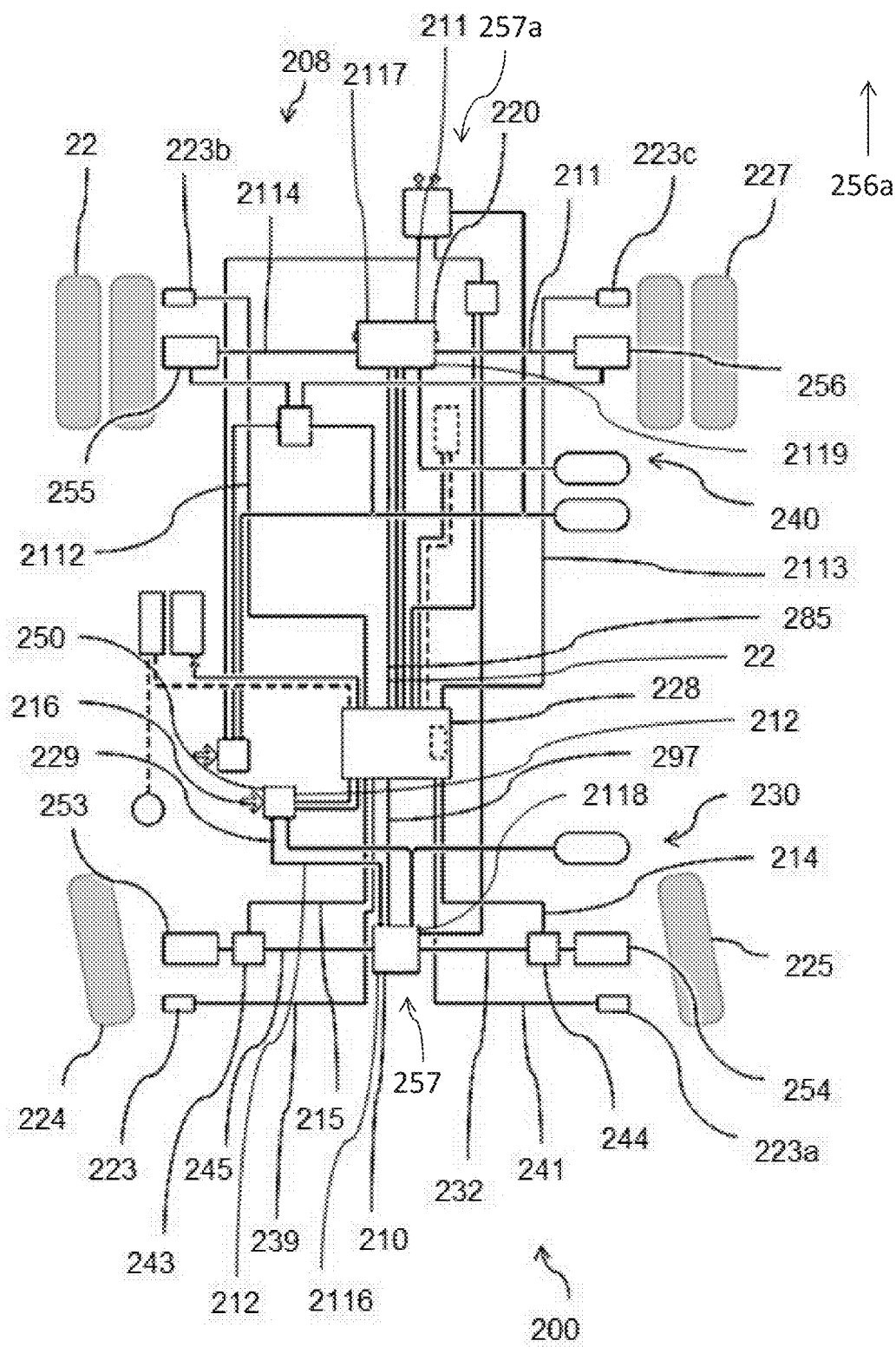
FIG. 5 shows a schematic view of a vehicle in which the brake system is embodied as an anti-lock brake system.

FIG. 5 shows the electro-pneumatic brake system 2 of a vehicle 200 which is embodied as an anti-lock braking system (ABS) 201. ABS systems 201 have the function of preventing the locking of vehicle wheels 224, 225, 226, 227 owing to vigorous activation of the service brake predominantly at a low coefficient of friction. As a result, lateral guidance forces are to be maintained at the braked vehicle wheels 224, 225, 226, 227 even in the case of full braking operations, in order thereby to ensure the driving stability and steering capability of a vehicle 200 or of a vehicle combination within the scope of the physical possibilities. At the same time, the braking distance and the vehicle deceleration are to be optimized by utilizing the available frictional engagement between the vehicle wheels 224, 225, 226, 227 and the underlying surface.

The ABS 201 has in terms of design the same components as the EBS 38. These components are no longer explained in more detail in the exemplary embodiment. In addition, the example shows braking of the vehicle 200 with an ABS 201, during which a front axle 230 is braked pneumatically and a rear axle 240 is braked electro-pneumatically. On the basis of the same method of functioning it is also possible for the rear axle 240 to be braked pneumatically and the front axle 230 to be braked electro-pneumatically. Reference is made to the description according to FIG. 1. In contrast to the EBS 38, the ABS 201 generally does not comprise a pressure sensor 20 in an axle modulator 210 of the front axle 230 and does not comprise a pressure sensor 21 in an axle modulator 211 of the rear axle 240. Instead, the axle modulator 210 comprises a relay valve 2116 with possible pilot control by means of a 3/2-way valve 2118. The ABS control valves 243, 244 are connected downstream of the relay valve 2116.

In addition, wheel speeds of the wheel rotational speed sensors 223, 223a are read in directly by a central module 228. The same applies to wheel speeds 2110, 2111 of the wheel rotational speed sensors 223b, 223c of the rear axle 240. That is to say the wheel speed 2103 of the first wheel rotational speed sensor 223 of the front axle 230 is transmitted from the wheel rotational speed sensor 223 to a central module 228 via a first wheel rotational speed sensor signal line 239 of the first wheel rotational speed sensor 223 and evaluated.

The wheel speed 2104 of the second wheel rotational speed sensor 223a of the front axle 230 is transmitted from the wheel rotational speed sensor 223a to the central module 228 via a second wheel rotational speed sensor signal line 241 of the second wheel rotational speed sensor 223a and evaluated.

The wheel speed 2110 of the wheel rotational speed sensor 223b of the rear axle 240 is transmitted from the wheel rotational speed sensor 223b to the central module 228 via a third wheel rotational speed sensor signal line 2112 of the wheel rotational speed sensor 223b and evaluated.

The wheel speed 2111 of the wheel rotational speed sensor 223c of the rear axle 240 is transmitted from the wheel rotational speed sensor 223a to the central module 228 via a fourth wheel rotational speed sensor signal line 2113 of the wheel rotational speed sensor 223c and evaluated. Generally, the activation of a brake pedal 216 is also sensed in the ABS 208 with the brake value transmitter 250.

If the brake value transmitter 250 is not fault-free or functionally capable, the driver's request is passed through indirectly via the pneumatic redundancy pressure 19 directly to the axle modulator 210 of the front axle 230. The front axle brake pressure 212 is transmitted via a pneumatic line 229 from the brake value transmitter 250 to the axle modulator 210. The front axle brake pressure 212 is transmitted from the axle modulator 210 to a solenoid control valve 243 of the first front wheel 224 via the front axle ABS valve 233 of the axle modulator 210, primarily via a solenoid control valve line 245 of the first wheel 224 of the front axle 230. The front axle brake pressure 212 acting on the brake cylinder 253 of the first front wheel 224 is transmitted from a solenoid control valve 243. The first front wheel 224 is braked in accordance with the front axle brake pressure 212. Secondly, the front axle brake pressure 212 is transmitted from the axle modulator 210 to a solenoid control valve 244 of the second front wheel 225 via a solenoid control valve line 246 of the second wheel 225 of the front axle 230. The front axle brake pressure 212 acting on a brake cylinder 254 of the second front wheel 225 is transmitted from the solenoid control valve 245. The first front wheel 225 is braked in accordance with the front axle brake pressure 212. The wheel speeds 2103, 2104 which are sensed by the wheel rotational speed sensors 223, 223a are subsequently read in to the central module 228 and evaluated. In addition, when there is a non-fault-free brake value transmitter 250, the driver's request is determined indirectly as an electrical redundancy signal 22 by means of the wheel rotational speeds or the wheel slip 257, 257a derived therefrom and the deceleration 256, 256a of the vehicle and used by the central module 228 to actuate the axle modulator 220 of the rear axle 240.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS

1 Vehicle
2 Electro-pneumatic brake system
3 Front axle
4 Rear axle
5 Brake value transmitter
6 First switch of brake value transmitter
7 Second switch of brake value transmitter
8 First brake control signal
9 Second brake control signal
10 Axle modulator of the front axle
11 Axle modulator of the rear axle
12 Front axle brake pressure
13 Rear axle brake pressure 14 Redundancy signal
16 Brake pedal
17 Auxiliary brake pressure of the front axle 3
18 Auxiliary brake pressure of the rear axle 4
19 Pneumatic redundancy pressure
20 Pressure sensor of the axle modulator 10 of the front axle 3
21 Pressure sensor of the axle modulator 11 of the rear axle 4
22 Electrical redundancy signal
23 First rotational speed sensor of the front axle 3
23a Second rotational speed sensor of the front axle 3
23b First rotational speed sensor of the rear axle 4
23c Second rotational speed sensor of the rear axle 4
24 First wheel of the front axle 3
25 Second wheel of the front axle 3
26 First wheel of the rear axle 4
27 Second wheel of the rear axle 4
28 Central module
29 Pneumatic line of the brake value transmitter 5
30 Pressure supply line of the brake value transmitter 5 and of the axle modulator 10 of the front axle 3
31 Relay valve
35 Front axle redundancy valve
36 Rear axle redundancy valve
38 Electric brake system (EBS)
39 First wheel rotational speed sensor signal line of the first wheel rotational speed sensor 23 of the front axle 3
40 Second wheel rotational speed sensor signal line of the second wheel rotational speed sensor 23a of the front axle 3
41 Third wheel rotational speed sensor signal line of the third wheel rotational speed sensor 23b
42 Fourth wheel rotational speed sensor signal line of the fourth wheel rotational speed sensor 23c
43 Anti-lock brake system (ABS) solenoid control valve of the first wheel 24 of the front axle 3
44 Anti-lock brake system (ABS) solenoid control valve of the second wheel 25 of the front axle 3
45 Solenoid control valve line of the first wheel 24 of the front axle 3
46 Solenoid control valve line of the second wheel 25 of the front axle 3
53 Brake cylinder of the first wheel 24 of the front axle 3
54 Brake cylinder of the second wheel 25 of the front axle 3
55 Brake cylinder of the first wheel 26 of the rear axle 4
56 Brake cylinder of the second wheel 27 of the rear axle 4
57 Parking brake operator control element
58 Brake system data bus interface
59 Steering wheel angle sensor
61 Electro-pneumatic handbrake system
62 Trailer brake system data bus interface
65 Trailer brake pressure
66 Trailer supply pressure
67 Supply pressure accumulator of the trailer control valve 122
68 Supply pressure accumulator of the axle modulator 11 of the rear axle 4
69 Supply pressure accumulator of the axle modulator 10 of the front axle 3 and of the brake value transmitter 5
70 Inlet valve of the axle modulator 10 of the front axle 3
70a Inlet valve of the axle modulator 11 of the rear axle 4
71 Outlet valve of the axle modulator 10 of the front axle 3
71a Outlet valve of the axle modulator 11 of the rear axle 4
73 First air filter
74 Second air filter
75 Third air filter
77 Sound damper of the axle modulator 10
81 Brake value transmitter relay valve
89 First travel signal of the brake value transmitter 5
90 Second travel signal of the brake value transmitter 5
92 Relay valve line of the axle modulator 10, 11
93 Inlet valve line
93a Second inlet valve line
94 Redundancy valve line
94a Second redundancy valve line
95 First outlet valve line
96 Second outlet valve line
97 First signal line from the axle modulator 10 of the front axle 3 to the central module 28
100 Orifice
101 Second signal line from the central module 28 to the brake value transmitter 5
113 Setpoint pressure value
114 Third signal line from the axle modulator 11 of the rear axle 4 to the central module 28
115 Battery
116 First travel sensor of the brake value transmitter 5
117 Second travel sensor of the brake value transmitter 5
119 Electrical pressure sensor signal
122 Trailer control valve
123 Redundancy valve of the trailer control valve 122
124 Pressure control valve of the trailer control valve 122
125 Relay valve pressure control line
126 Relay control valve connecting line
127 Pressure sensor of the trailer control valve 122
200 Vehicle
201 Anti-lock brake system (ABS)
210 Axle modulator of the front axle 230
211 Axle modulator of the rear axle 240
212 Front axle brake pressure
214 Control line of the solenoid control valve 243 of the first front wheel 224
215 Control line of the solenoid control valve 244 of the second front wheel 225
216 Brake pedal
220 Axle modulator of the rear axle 240
223 First wheel rotational speed sensor of the front axle 230
223a Second wheel rotational speed sensor of the front axle 230
223b First wheel rotational speed sensor of the rear axle 240
223c Second wheel rotational speed sensor of the rear axle 240
224 First front wheel of the vehicle 200
225 Second front wheel of the vehicle 200
226 First rear wheel of the vehicle 200
227 Second rear wheel of the vehicle 200
228 Central module of the vehicle 200
229 Pneumatic line from the brake value transmitter 250 to the axle modulator 210
230 Front axle of the vehicle 200
233 Front axle ABS valve
234 Rear axle ABS valve
239 First wheel rotational speed sensor signal line of the first wheel rotational speed sensor 223

240 Rear axle
241 Second wheel rotational speed sensor signal line of the second wheel rotational speed sensor 223a
243 ABS valve of the first front wheel 224
244 ABS valve of the second front wheel 225
245 Solenoid control valve line of the first front wheel 224
246 Solenoid control valve line of the second front wheel 225
250 Brake value transmitter of the vehicle 200
253 Brake cylinder of the first front wheel 224
254 Brake cylinder of the second front wheel 225
256 Deceleration of the front axle 3 of the vehicle 200
256a Deceleration of the rear axle 4 of the vehicle 200
257 Wheel slip of the front axle 3
257a Wheel slip of the rear axle 4
2112 Third wheel rotational speed sensor signal line of the first wheel rotational speed sensor 223b of the rear axle 240
2113 Fourth wheel rotational speed sensor signal line of the second wheel rotational speed sensor 223c of the rear axle 240
2114 Brake cylinder line of the first rear wheel 226
2115 Brake cylinder line of the second rear wheel 227
2116 Relay valve of the axle modulator of the front axle 230
2117 Relay valve of the axle modulator of the rear axle 208
2118 3/2-way valve of the axle modulator of the front axle 230
2119 3/2-way valve of the axle modulator of the rear axle 208

The invention claimed is:

1. A method for decelerating a vehicle, wherein the vehicle includes an electro-pneumatic brake system, at least one front axle, at least one rear axle, and a brake value transmitter with at least one sensor for generating a brake control signal for performing open-loop and/or closed-loop control of the brake system, wherein the vehicle further includes at least one axle modulator for the front axle of the vehicle, for performing open-loop and/or closed-loop control of at least one front axle brake pressure at the at least one front axle, and/or at least one axle modulator for the rear axle of the vehicle, for performing open-loop and/or closed-loop control of a rear axle brake pressure at the at least one rear axle of the vehicle, the method comprising:
   a. generating a redundancy signal at a first axle, the front axle or rear axle, or at a trailer control valve, and
   b. performing open-loop and/or closed-loop control of an auxiliary brake pressure at another axle, the front axle or the rear axle, via the redundancy signal.

2. The method for decelerating a vehicle as claimed in claim 1, wherein the redundancy signal is a pneumatic redundancy pressure of the front axle or of the rear axle or of the trailer control valve for performing open-loop and/or closed-loop control of the auxiliary brake pressure of the front axle or of the rear axle.

3. The method for decelerating a vehicle as claimed in claim 2, wherein the pneumatic redundancy pressure is determined by a pressure sensor at the front axle, at the rear axle or at the trailer control valve for performing open-loop and/or closed-loop control of the auxiliary brake pressure of the front axle or of the auxiliary brake pressure of the rear axle.

4. The method for decelerating a vehicle as claimed in claim 3, wherein the pressure sensor is integrated into the axle modulator of the front axle and/or into the axle modulator of the rear axle and/or a trailer control valve of the electro-pneumatic brake system.

5. The method for decelerating a vehicle as claimed in claim 1, wherein the redundancy signal is an electrical redundancy signal for performing open-loop and/or closed-loop control of the auxiliary brake pressure of the front axle or of the auxiliary brake pressure of the rear axle.

6. The method for decelerating a vehicle as claimed in claim 5, wherein the electrical redundancy signal is determined at least with a wheel rotational speed sensor, by decelerating the front axle or decelerating a rear axle and/or by a wheel slip of the front axle or a wheel slip of the rear axle, in the electro-pneumatic brake system.

7. The method for decelerating a vehicle as claimed in claim 6, wherein the at least one wheel rotational speed sensor is arranged at least on a wheel of the front axle or at least on a wheel of the rear axle of the brake system.

8. The method for decelerating a vehicle as claimed in claim 1, wherein the redundancy signal is compared with a first and/or second brake control signal in the brake value transmitter or in a central module in order to check a plausibility of a correctness or a presence of the first and/or of the second brake control signal.

9. An electro-pneumatic brake system, comprising:
   at least one brake value transmitter including at least one sensor configured to generate a brake control signal for performing open-loop and/or closed-loop control of the brake system; and
   at least one of:
      at least one axle modulator for a front axle of the vehicle for performing closed-loop and/or open-loop control of at least one auxiliary brake pressure at the front axle, and
      at least one axle modulator for a rear axle of the vehicle, for performing closed-loop and/or open-loop control of an auxiliary brake pressure at the rear axle of the vehicle,
   wherein the electro-pneumatic brake system is configured to determine, when the brake control signal of the at least one sensor in the brake value transmitter is not present or is faulty, a redundancy signal at the front axle, at the rear axle or alternatively in/at a trailer control valve, and to use the redundancy signal to decelerate the at least one front axle or alternatively the at least one rear axle.

10. The electro-pneumatic brake system as claimed in claim 9, wherein the redundancy signal is a pneumatic redundancy pressure for performing open-loop and/or closed-loop control of the auxiliary brake pressure of the front axle or alternatively of the rear axle.

11. The electro-pneumatic brake system as claimed in claim 9, wherein the brake system comprises a pressure sensor for determining the pneumatic redundancy pressure at the front axle or at the rear axle or at the trailer control valve of the vehicle.

12. The electro-pneumatic brake system as claimed in claim 9, wherein the electro-pneumatic brake system comprises a pneumatic inlet valve line leading to at least one inlet valve and at least one outlet valve of the axle modulator of the front axle or to at least one inlet valve and at least one outlet valve of the axle modulator of the rear axle, wherein the inlet valve and the outlet valve of the axle modulator of the front axle or the inlet valve and the outlet valve of the axle modulator of the rear axle are closed in order to determine the redundancy signal, and comprise at least one front axle redundancy valve of the axle modulator of the front axle or alternatively at least one rear axle redundancy valve of the axle modulator of the rear axle, wherein either the at least one front axle redundancy valve or the at least one rear axle redundancy valve is opened in order to determine the redundancy signal.

13. The electro-pneumatic brake system as claimed in claim 9, wherein the redundancy signal is an electrical redundancy signal for performing open-loop and/or closed-loop control of the auxiliary brake pressure of the front axle or alternatively of the rear axle.

14. The electro-pneumatic brake system as claimed in claim 13, wherein the electro-pneumatic brake system comprises at least one wheel rotational speed sensor for determining the electrical redundancy signal, and for determining the deceleration of the front axle or the deceleration of the rear axle of the vehicle, in the brake system.

15. The electro-pneumatic brake system as claimed in claim 9, wherein in the brake value transmitter or in a central module a comparison with the redundancy signal is made with a first and/or second brake control signal in order to check a plausibility of the brake control signal being correct or present.

16. The electro-pneumatic brake system as claimed in claim 9, wherein a first electronic brake control signal is designed to actuate an inlet valve and an outlet valve of the axle modulator of the front axle, and/or a second electronic brake control signal is designed to actuate an inlet valve and an outlet valve of the axle modulator of the rear axle.

17. The electro-pneumatic brake system as claimed in claim 9, wherein the brake system is designed to perform open-loop and/or closed-loop control of the auxiliary brake pressure of the front axle or of the rear axle directly with the redundancy signal.

18. A vehicle having an electro-pneumatic brake system as claimed in claim 9.

\* \* \* \* \*